United States Patent
De Jong

(10) Patent No.: US 7,080,261 B1
(45) Date of Patent: Jul. 18, 2006

(54) COMPUTER-READABLE MEDIUM WITH MICROPROCESSOR TO CONTROL READING AND COMPUTER ARRANGED TO COMMUNICATE WITH SUCH A MEDIUM

(75) Inventor: Eduard Karel De Jong, Amsterdam (NL)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/148,916

(22) PCT Filed: Dec. 7, 1999

(86) PCT No.: PCT/NL99/00748

§ 371 (c)(1),
(2), (4) Date: Oct. 9, 2002

(87) PCT Pub. No.: WO01/43129

PCT Pub. Date: Jun. 14, 2001

(51) Int. Cl.
*G11B 7/00* (2006.01)
*G06F 1/00* (2006.01)

(52) U.S. Cl. .............. 713/193; 380/200; 380/201; 380/202; 380/203; 705/57

(58) Field of Classification Search ............... 380/201, 380/200, 202, 203; 705/57; 713/193
See application file for complete search history.

(56) References Cited

U.S. PATENT DOCUMENTS

| | | |
|---|---|---|
| 4,425,642 A | 1/1984 | Moses et al. |
| 4,582,985 A | 4/1986 | Lofberg |
| 4,757,495 A | 7/1988 | Decker et al. |
| 4,853,522 A | 8/1989 | Ogasawara |
| 4,874,935 A | 10/1989 | Younger |
| 4,921,278 A | 5/1990 | Shiang et al. |
| 4,930,129 A | 5/1990 | Takahira |
| 4,953,160 A | 8/1990 | Gupta |
| 5,057,997 A | 10/1991 | Chang et al. |
| 5,148,546 A | 9/1992 | Blodgett |
| 5,177,768 A | 1/1993 | Crespo et al. |
| 5,204,663 A | 4/1993 | Lee |
| 5,204,897 A | 4/1993 | Wyman |

(Continued)

FOREIGN PATENT DOCUMENTS

DE 4126213 2/1993

(Continued)

OTHER PUBLICATIONS

Sun Microsystems, Inc., "Java Card Runtime Environment (JCRE) 2.1 Specification," Final Revision 1.0, Feb. 24, 1999.

(Continued)

*Primary Examiner*—Ayaz Sheikh
*Assistant Examiner*—Taghi T. Arani
(74) *Attorney, Agent, or Firm*—Finnegan, Henderson, Farabow, Garrett & Dunner LLP

(57) ABSTRACT

Computer-readable medium provided with a memory area (2; 26, 28) for storing data and a distinct microprocessor (3) having a communication interface (4), a memory unit (7) and a processor unit (5) connected to both the communication interface (4) and the memory unit (7). The data may include a first data portion which is arranged to be read and decrypted by a computer arrangement (11) provided at least one condition is met, and the microprocessor (3) being arranged to generate at least one cryptographic key once the condition is met that is necessary to decrypt the data. The invention is also directed to a computer arrangement arranged to communicate with such a medium.

26 Claims, 4 Drawing Sheets

U.S. PATENT DOCUMENTS

| | | | |
|---|---|---|---|
| 5,283,885 A | 2/1994 | Hollerbauer | |
| 5,365,576 A | 11/1994 | Tsumura et al. | |
| 5,404,377 A | 4/1995 | Moses | |
| 5,446,901 A | 8/1995 | Owicki et al. | |
| 5,452,431 A | 9/1995 | Bournas | |
| 5,453,602 A | 9/1995 | Hanada | |
| 5,469,559 A | 11/1995 | Parks et al. | |
| 5,479,509 A * | 12/1995 | Ugon | 713/176 |
| 5,481,715 A | 1/1996 | Hamilton et al. | |
| 5,511,176 A | 4/1996 | Tsuha | |
| 5,534,372 A | 7/1996 | Koshizuka et al. | |
| 5,544,246 A | 8/1996 | Mandelbaum et al. | |
| 5,594,227 A | 1/1997 | Deo | |
| 5,649,118 A | 7/1997 | Carlisle et al. | |
| 5,649,188 A | 7/1997 | Nomura et al. | |
| 5,657,379 A | 8/1997 | Honda et al. | |
| 5,721,781 A | 2/1998 | Deo et al. | |
| 5,742,756 A | 4/1998 | Dillaway et al. | |
| 5,754,649 A * | 5/1998 | Ryan et al. | 380/203 |
| 5,764,763 A | 6/1998 | Jensen et al. | |
| 5,768,385 A | 6/1998 | Simon | |
| 5,781,723 A | 7/1998 | Yee et al. | |
| 5,790,489 A | 8/1998 | O'Connor | |
| 5,802,519 A | 9/1998 | De Jong | |
| 5,832,119 A | 11/1998 | Rhoads | |
| 5,862,117 A | 1/1999 | Fuentes et al. | |
| 5,869,823 A | 2/1999 | Bublitz et al. | |
| 5,881,152 A | 3/1999 | Moos | |
| 5,884,316 A | 3/1999 | Bernstein et al. | |
| 5,889,868 A * | 3/1999 | Moskowitz et al. | 713/176 |
| 5,894,550 A | 4/1999 | Thiriet | |
| 5,896,393 A | 4/1999 | Yard et al. | |
| 5,905,798 A * | 5/1999 | Nerlikar et al. | 705/57 |
| 5,905,819 A | 5/1999 | Daly | |
| 5,912,453 A | 6/1999 | Gungl et al. | |
| 5,915,027 A * | 6/1999 | Cox et al. | 380/54 |
| 5,930,363 A | 7/1999 | Stanford et al. | |
| 5,940,363 A * | 8/1999 | Ro et al. | 369/273 |
| 6,005,940 A | 12/1999 | Kulinets | |
| 6,052,690 A | 4/2000 | De Jong | |
| 6,055,615 A | 4/2000 | Okajima | |
| 6,058,483 A | 5/2000 | Vannel | |
| 6,094,656 A | 7/2000 | De Jong | |
| 6,104,812 A | 8/2000 | Koltai et al. | |
| 6,168,207 B1 * | 1/2001 | Nishizawa | 283/91 |
| 6,173,391 B1 | 1/2001 | Tabuchi et al. | |
| 6,182,158 B1 | 1/2001 | Kougiouris et al. | |
| 6,212,633 B1 | 4/2001 | Levy et al. | |
| 6,220,510 B1 | 4/2001 | Everett et al. | |
| 6,241,153 B1 | 6/2001 | Tiffany, III | |
| 6,250,555 B1 | 6/2001 | Inamoto | |
| 6,257,486 B1 | 7/2001 | Teicher et al. | |
| 6,257,490 B1 | 7/2001 | Tafoya | |
| 6,292,874 B1 | 9/2001 | Barnett | |
| 6,310,956 B1 * | 10/2001 | Morito et al. | 380/201 |
| 6,311,186 B1 | 10/2001 | MeLampy et al. | |
| 6,311,280 B1 | 10/2001 | Vishin | |
| 6,325,285 B1 | 12/2001 | Baratelli | |
| 6,345,104 B1 | 2/2002 | Rhoads | |
| 6,349,336 B1 | 2/2002 | Sit et al. | |
| 6,374,355 B1 * | 4/2002 | Patel | 713/168 |
| 6,385,645 B1 | 5/2002 | De Jong | |
| 6,480,831 B1 * | 11/2002 | Cordery et al. | 705/60 |
| 6,480,935 B1 | 11/2002 | Carper et al. | |
| 6,484,946 B1 | 11/2002 | Matsumoto et al. | |
| 6,535,997 B1 | 3/2003 | Janson et al. | |
| 6,546,112 B1 | 4/2003 | Rhoads | |
| 6,572,025 B1 | 6/2003 | Nishikado et al. | |
| 6,608,911 B1 | 8/2003 | Lofgren et al. | |
| 6,742,712 B1 | 6/2004 | Kawaguchi et al. | |
| 6,808,118 B1 | 10/2004 | Field | |

FOREIGN PATENT DOCUMENTS

| | | |
|---|---|---|
| DE | 4242247 A1 | 6/1994 |
| DE | 19600081 | 7/1997 |
| EP | 0190733 | 8/1986 |
| EP | 0251861 A1 | 1/1988 |
| EP | 0466969 | 1/1992 |
| EP | 0581317 A2 | 2/1994 |
| EP | 0666550 | 8/1995 |
| EP | 0674295 A1 | 9/1995 |
| EP | 0723226 | 7/1996 |
| EP | 0 849 734 A2 | 6/1998 |
| EP | 0864996 A2 | 9/1998 |
| EP | 893752 A1 * | 1/1999 |
| EP | 0917152 A1 | 5/1999 |
| FR | 2776153 | 9/1999 |
| JP | 01277993 A | 11/1989 |
| JP | 02156357 A | 6/1990 |
| JP | 05089303 A | 4/1993 |
| JP | 09326046 A | 12/1997 |
| JP | 200015886 | 1/2000 |
| JP | 2001126046 | 5/2001 |
| WO | WO 87/07062 | 11/1987 |
| WO | WO 89/02140 | 3/1989 |
| WO | WO 94/10657 | 5/1994 |
| WO | WO 97/41562 | 11/1997 |
| WO | WO 98/19237 | 5/1998 |
| WO | WO 98/37526 | 9/1998 |
| WO | WO 99/16030 | 9/1998 |
| WO | WO 99/35791 | 7/1999 |
| WO | WO 99/38162 | 7/1999 |

OTHER PUBLICATIONS

K. Matsui, et al., "Video-Steganography; How to Secretly Embed a Signature in a Picture," IMA Intellectual Property Project Proceedings, vol. 1, Issue 1, pp. 187-206 (Jan. 1994).

Yukihiro, Ukai, "Storage Medium and Stroage Medium Driving Device", Patent Abstracts of Japan, JP 11161551 (Jun. 18, 1999).

Chan, "Infrastructure of Multi-Application Smart Card," http://home.hkstar.com/~alanchan/papers/multiApplicationSmartCard/, Jul. 25, 2002.

Cordonnier, et al., "The Concept of Suspicion: A New Security Model for Identification Management in Smart Cards," http://inforge.unil.ch/isdss97/papers/48.htm, (1997).

Daniels, John et al., "Strategies for Sharing Objects in Distributed Systems," JOOP, Object Designers Ltd., Uk., pp. 27-36.

Gong, L. et al., "Going Beyond the Sandbox: An Overview of the New Security Architecture in the JavaDevelopment Kit 1.2" Proc. Usenix Sym. Internet Technologies and Systems, Dec. 8, 1997.

Islam, et al., "A Flexible Security Model for Using Internet Content," IBM Thomas J. Watson Research Center Papers, 'Online!', Jun. 28, 1997, from http://www.ibm.com/java/education/flexsecurity.

Lee, Chan Y., "Detecting Out-Of-Range References," http://127.0.0.1:8080/vtopic/isapi?action+Views &VdkVgwKev=%2E@2E%2Fdata%2F1 993%2F, Jul. 24, 2002.

Philips Semiconductor, "Designers Offered First 16-Bit Smart Card IC Architecture with Development Tools," Press Release, Jul. 25, 2002.

Ritchey, Tim, "Advanced Topics: The Java Virtual Machine," Java!, Chapter 14, pp. ii-x and 325-346, Sep. 22, 1995.

Sun Microsystems, Inc., "Java Card™ 2.0 Language Subset and Virtual Machine Specification," Oct. 13, 1997, Revision 1.0 Final.

Sun Microsystems, Inc., "Java Card™ 2.0 Programming Concepts," Oct. 15, 1997, Revision 1.0 Final.

"Sun Microsystems Announces JAVACARD API," Business Wire, Oct. 1996.

Sun Microsystems, Inc., "Java Card Runtime Environment (JCRE) 2.1 Specification—Draft 2," Dec. 14, 1998.

"Java Card Applet Developer's Guide," Revision 1.12, Aug. 19, 1998, Sun Microsystems, Inc.

Sun Microsystems, Inc., "Java Card™ 2.0 Application Programming Interfaces," Oct. 13, 1997, Revision 1.0 Final.

* cited by examiner

COMPUTER-READABLE MEDIUM WITH MICROPROCESSOR TO CONTROL READING AND COMPUTER ARRANGED TO COMMUNICATE WITH SUCH A MEDIUM

BACKGROUND OF THE INVENTION

This invention relates to computer-readable medium provided with a memory area like a CD-ROM, a floppy disk, a cassette, a CD, a mini-disk and a DVD. For the sake of simplicity, hereinafter, these media will be called "data carriers".

Such a data carrier comprises data, e.g., in the form of computer software to be loaded into a computer of a user who bought it. However, in practice, often the data available on such a data carrier can be read many times whereas the producer of the data wishes to be paid again for every new loading in another computer. Nowadays, buyers are often signing a kind of contract promising not to infringe the copyright associated with the data. However, that is not a technical hindrance to illegal copying of the data. In practice, large-scale checking of illegal copies at the premises of, especially, end-users is almost impossible.

SUMMARY OF THE INVENTION

Therefore, it is an object to provide technical means that provide a strong protection against illegal copying of data on the data carrier.

In accordance with the present invention such illegal copying may be prevented with a computer-readable medium provided with a memory area for storing data and a distinct microprocessor comprising a communication interface for communication with an external device, a memory unit and a processor unit connected to both the communication interface and the memory unit.

With such a device, the intellectual property rights of data, albeit music, pictures or executable software stored on mass produces digital data carriers can be upheld effectively at little additional costs. The microprocessor is used to carry out protecting functions as to the data stored on the data carrier. This protection may relate to the number of times the data may be loaded in a computer, who is authorized to load the data in a computer, etc.

Such a protection may, e.g., be implemented by a computer-readable medium as defined above, wherein the data comprises a first data portion which is arranged to be read by a computer arrangement and to be decrypted by the computer arrangement using at least one cryptographic key provided at least one condition is met, and the processor unit being arranged to communicate with the computer arrangement through the communication interface in order to check whether the condition is met and to generate the cryptographic key for the computer arrangement once the condition is met.

Moreover, the data may comprise a second data portion comprising key related data necessary for the processor unit to generate the at least one cryptographic key.

The computer-readable medium may have a circular shape with a center of rotation and the communication interface being an antenna symmetrically shaped about the center of rotation.

One of the conditions to be met may be user authentication and, then, the processor unit is arranged to receive authentication information through the communication interface and to establish user authentication based on the authentication information received.

Alternatively, or additionally, one of the conditions to be met is period of time the data may be read and decrypted by either the computer arrangement or an other computer arrangement, the period of time being part of the data.

Moreover, alternatively, or additionally, one of the conditions to be met is maximum number of times the data may be read and decrypted from the computer-readable medium, the maximum number of times being monitored by the processor unit.

In a further embodiment, the processor unit in the computer-readable medium is arranged for carrying out the decrypting based on executable codes received through said communication interface. Once again, the processor unit is, then, preferably, arranged to validate these executable codes, e.g., by means of a specific key stored in the memory unit.

In one embodiment, the computer-readable medium is provided with a physical structure connected to the processor unit, the processor unit being arranged to check physical integrity of the physical structure and stop operating as soon as the processor unit establishes that the physical integrity is violated.

The invention also relates to a computer arrangement arranged to communicate with a computer-readable medium, the medium being provided with a memory area for storing data and a distinct microprocessor comprising a communication interface, a memory unit and a processor unit connected to both the microprocessor interface and the memory unit, the computer arrangement being provided with a processor, a memory connected to the processor, a first interface unit connected to the processor for communicating with the memory area of the computer-readable medium and a second interface unit connected to the processor for communicating with the microprocessor unit through the communication interface.

The invention also relates to a method of reading and decrypting data from a computer-readable medium, the medium being provided with a memory area for storing data and a distinct microprocessor comprising a communication interface, a memory unit and a processor unit connected to both the communication interface and the memory unit, the method comprising the following steps:

(a) receiving at least one cryptographic key from the processor unit;

(b) reading a first data portion from the memory area in the computer-readable medium (c) decrypting first data portion using the at least one cryptographic key.

The invention also relates to a data carrier provided with a computer program and to a computer program product for carrying out such a method.

Moreover, the invention relates to a method of giving access to data stored on a computer-readable medium, said medium being provided with a memory area storing said data and a distinct microprocessor comprising a communication interface, a memory unit and a processor unit connected to both said communication interface and said memory unit, wherein said data comprises a first data portion which is arranged to be read by a computer arrangement and to be decrypted by said computer arrangement using at least one cryptographic key provided at least one condition is met, said method including the steps of (a) communicating with said computer arrangement through said communication interface,
(b) checking whether said condition is met and
(c) generating said cryptographic key for said computer arrangement once the condition is met.

The invention also relates to a data carrier provided with a computer program and to a computer program product for carrying out such a latter method.

BRIEF DESCRIPTION OF THE DRAWINGS

Hereinafter, the invention will be explained with reference to some drawing which are intended to illustrate the invention and not to limit its scope.

DESCRIPTION OF PREFERRED EMBODIMENT

Figure 1:
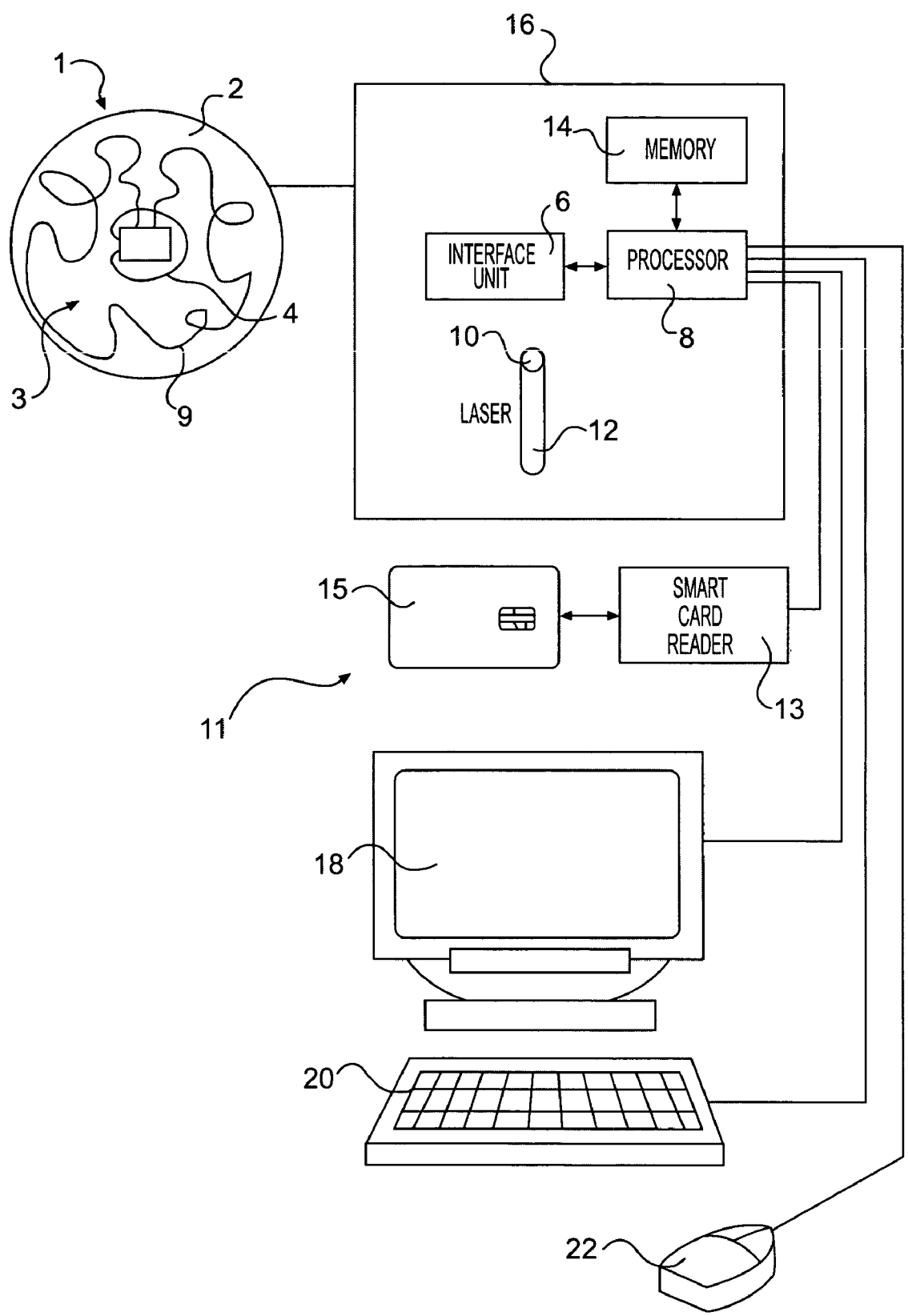
FIG. 1 shows a data carrier provided with a distinct microprocessor to protect its data from illegal copying, as well as a system to read data from the data carrier.

The invention relates to digital data storage devices in which digital data, possibly organized in distinctly referably sections, is stored. The data may be retrieved in some form by a computer system and then used by a user. FIG. 1 schematically shows some key elements. FIG. 1 shows a circular shaped data carrier 1, like a CD, or CD-ROM, having data stored in a memory area 2. The data may comprise both executable codes once loaded in a computer and non-functional data, like text, music and pictures.

Figure 2:
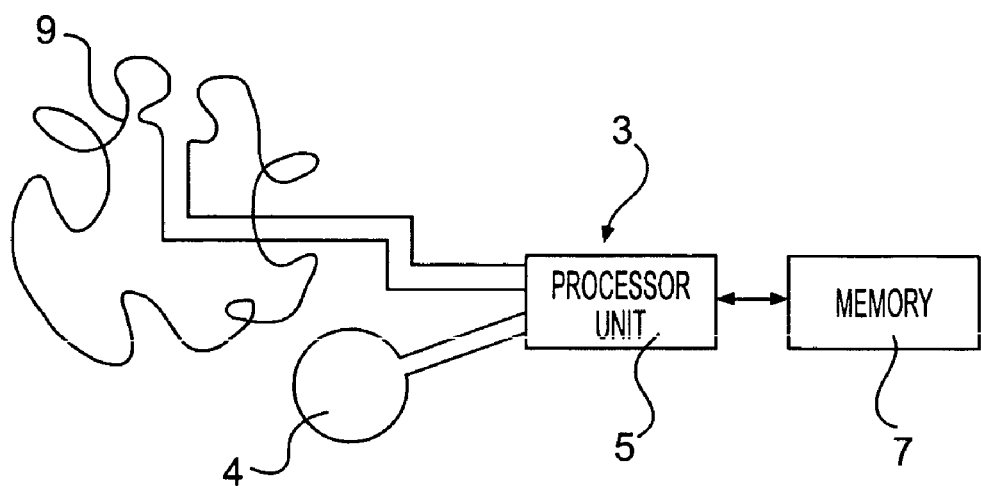
FIG. 2 schematically shows the microprocessor embedded in the data carrier.

In accordance with the invention, the data carrier 1 is provided with a microprocessor 3. FIG. 1 shows a circular antenna 4 as communication interface for a microprocessor unit not shown in FIG. 1. FIG. 2 shows an example of the micro-processor 3 comprising a processor unit 5 connected to the antenna 4 and a memory 7. The antenna preferably comprises one or more circular loops arranged such that they are centered about the center of rotation of the data carrier 1. The memory 7 may comprise any kind of memory like RAM, ROM, EPROM, EEPROM, etc. allowing the processor unit 5 to carry out its functions.

Preferably, the processor unit 5 itself is embedded in the data carrier structure such that it is tamper-resistant. Together with memory 7, it may be implemented as a single-chip microprocessor of a similar type as used in smart cards. As shown in FIG. 1, in case of a circular data carrier designed to rotate during reading, like a CD or CD-ROM, the microprocessor 3 is preferably located such that its center of gravity coincides with the center of rotation of the data carrier 1.

Preferably, the data carrier comprises an embedded physical structure 9 connected to the processor unit 5. The physical structure 9 is, e.g., made of one or more wire loops, the presence of which being detectable by the processor unit 5. If the microprocessor unit 5 is disconnected from the physical structure 9, e.g., either by removing the microprocessor 3 from the data carrier 1 or by damaging the data carrier 1, the processor unit 5 will detect that and will not be able anymore to carry out its protection function anymore. To that end, the processor unit 5 may detect the resistance of wire loops. Alternatively, the physical structure 9 may have some predetermined capacitance or inductance or any kind of (complex) impedance that can be detected by the processor unit 5. With such an additional structure 9, one cannot use the microprocessor 3 anymore after having removed it from the data carrier 1. Only reverse engineering could then provide knowledge about the content of the microprocessor 3. However, this content may be unique for each different microprocessor 3 such that reverse engineering will never be worthwhile.

FIG. 1 also shows a computer arrangement 11 comprising, e.g., a separate box 16 with a processor 8, a monitor 18, and input means like a keyboard 20 and a mouse 22. The box 16 also comprises a memory 14 connected to the processor 8. The memory is shown as one black box, however, it is to be understood that memory 14 may comprise any kind of memories, like RAM, ROM, EPROM, EEPROM, etc., to allow the processor 8 to carry out its normal operations.

In some embodiments, the computer arrangement 11 may comprise a smart card reader 13 connected to the processor 8 and arranged to read a smart card 15.

The processor 8 is shown to be connected to a laser unit 10 as an interface to read data from (and possibly write to) the data carrier 1. Of course, in case another kind of data carrier then a CD or CD-ROM is used, also another kind of interface 10 must be used. A groove 12 is provided to allow the laser unit 10 to move in a radial direction across the data carrier 1, as is known to persons skilled in the art.

Apart from the interface 10, the box 16 comprises another interface unit 6 that is arranged to allow the processor 8 to communicate with the processor unit 5 on the data carrier 1 when it is inserted into the box 16 to its reading position in which data may be read from the memory area 2 on the data carrier 1 by laser unit 10.

Figure 3:
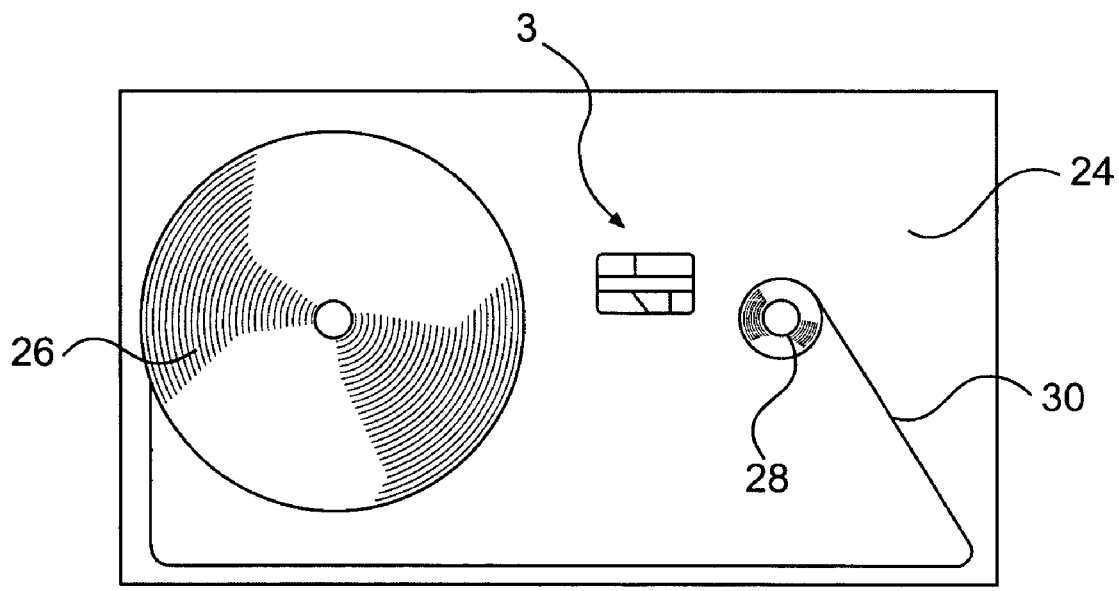
FIG. 3 schematically shows an alternative data carrier with additional microprocessor.

FIG. 3 shows an alternative embodiment of a data carrier according to the invention. It shows a cassette 24 with tape storing data and wound around two shafts 26, 28 as is known in the art. Again, a microprocessor 3 is embedded in the physical structure of the cassette 24. Alternatively, the microprocessor 3 may be located on the small side surface of the cassette 24.

Instead of a CD/CD-ROM as shown in FIG. 1 or a cassette as shown in FIG. 3, any other known type of data carrier, such as floppy disk, may be applied to carry out the present invention.

The processor unit 5 embedded in the data carrier 1 is programmed to control read and/or write access of the processor 8 to the data carrier memory area 2. To that end, the processor unit 5 is, preferably, arranged to generate one or more secret, cryptographic keys which are, e.g., initialized at the final stages of manufacturing of the data carrier 1 with its processor unit 5. The one or more keys are, preferably, unique to the data carrier and may be simply stored in memory 7 of the microprocessor 3 or be calculated by the processor unit 5, as will be explained hereinafter. Below, for the sake of simplicity of the description, it will be assumed that only one key is used.

Figure 4:
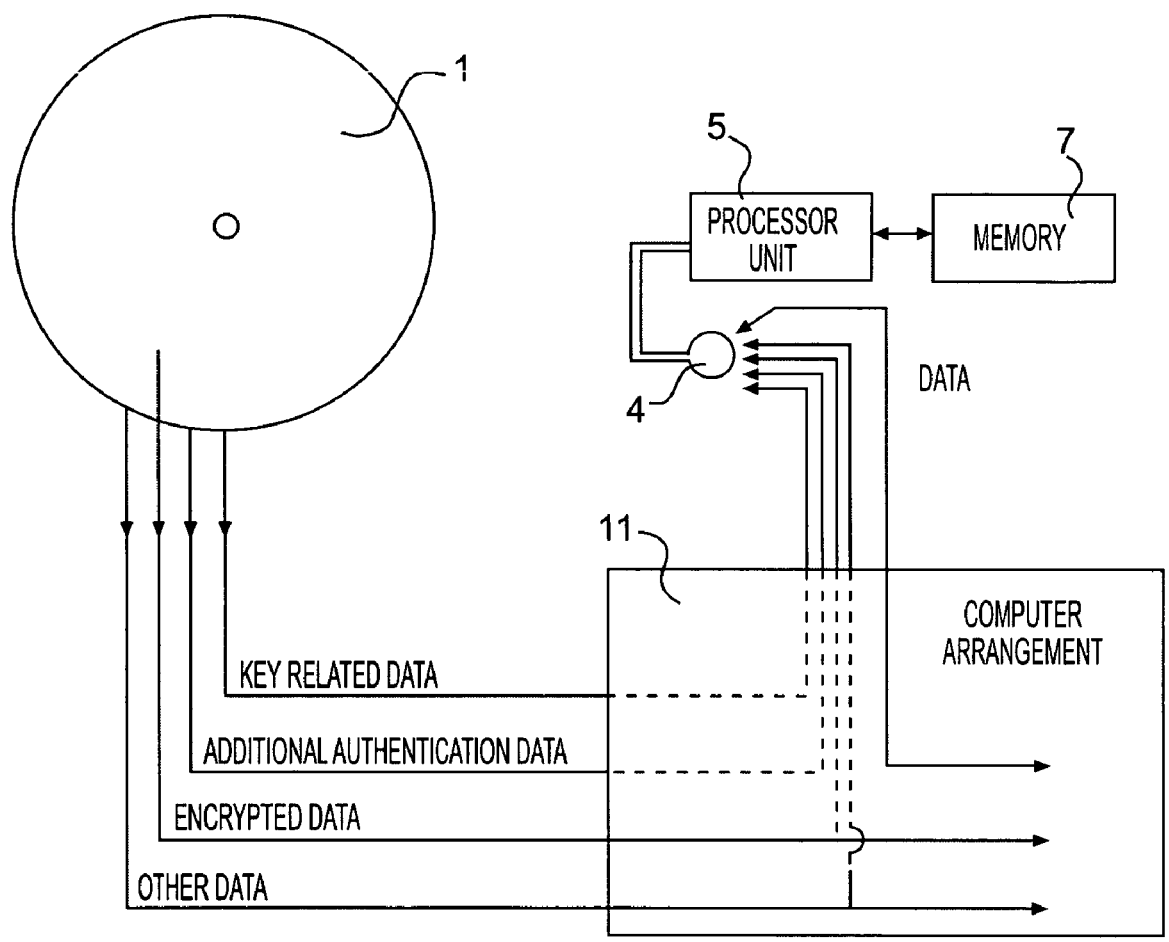
FIG. 4 schematically shows a possible data flow between the memory area of the data carrier, the microprocessor on the data carrier and the system arranged to read and decrypt data from the data carrier.

At least a portion of the data in memory area 2 is stored after being encrypted by the key. In one embodiment, the key is directly stored in memory 7 of the microprocessor 3. However, the processor unit 5 may be arranged to calculate the correct key based on one or more other (master) keys in memory 7 using key related data retrieved from memory area 2 on the data carrier 1. With reference to FIG. 4, such key related data will be read from the memory area 2 by processor 8 from the computer arrangement 11, preferably, without using any additional authorization mechanism, and then be transferred to the processor unit 5 through the communication interface 4. By using key related data stored in memory area 2 to allow processor unit 5 to calculate the necessary key using its own master key from memory unit 7, the encryption algorithms used to conceal data to be protected on the data carrier 1 can be selected to use very long keys, like in one-time pad calculations which require keys of the same length as the protected data.

Figure 5:
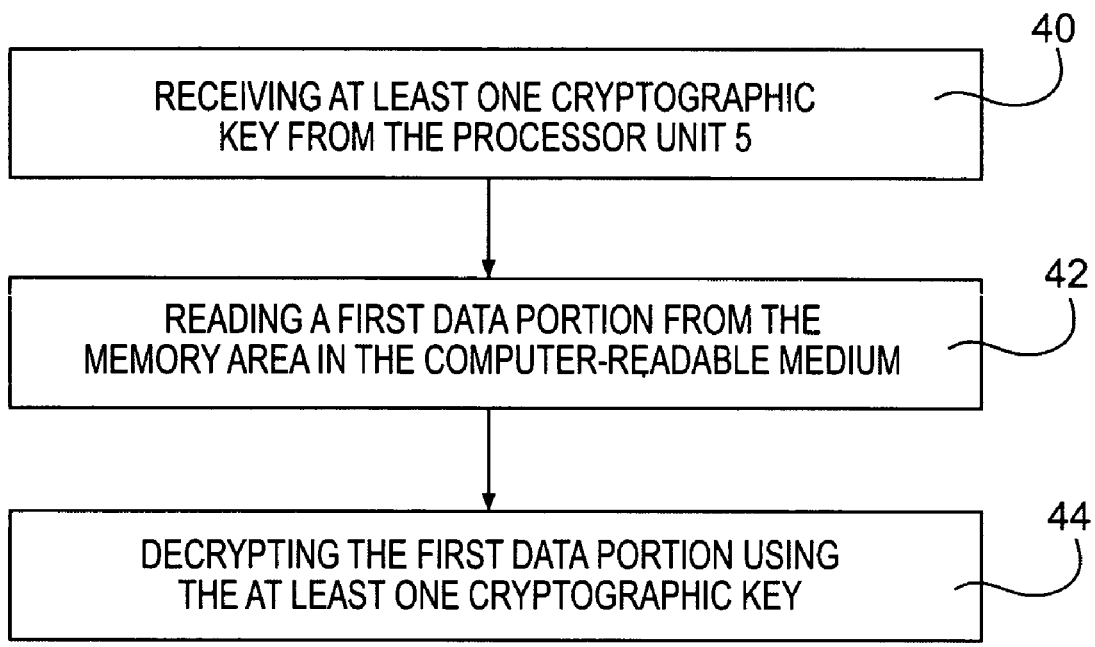
FIGS. 5 and 6 show flow diagrams of methods of the invention.

When the processor 8 of the computer arrangement 11 is instructed by a user, through its input means 20, 22, to read protected (encrypted) data from data carrier 1, it will request the processor unit 5 to generate the correct key. The processor unit 5 will send its key from memory 7 or calculate the correct key based on the key related data as indicated above and send the key to the processor 8. As indicated in step 40 of FIG. 5 the processor 8 will receive this key. Then, the processor 8 reads data from the memory area 2 of data carrier 1, step 42. As shown in step 44, the processor 8 will use the key to decrypt data read from the data carrier 1 and store the decrypted data in its memory 14. Instructions as to how to communicate with the data carrier 1 may be loaded from the data carrier 1 to the processor 8 in any way known to the person skilled in the art, e.g., by loading an execute file from data carrier 1 to processor 8.

In practice, the generation of the key by the processor unit 5 will be dependent on whether or not one or more conditions have been met. This is further explained in FIG. 6.

One such condition may be the time period that the data in the data carrier 1 may be read and decrypted after a predetermined date loaded in memory 7 of the microprocessor 3. The data may e.g. be a demonstration computer program which may be used during three months after which decryption will automatically be blocked.

Another condition may be the maximum number of times the data may be read from data carrier 1 and decrypted by processor 8 or any other processor external to data carrier 1. To that end, the microprocessor 3 may store such a maximum number and check whether the number of times it is requested by a computer arrangement to provide the key exceeds that maximum number. For instance, in many cases an end-user is allowed to read and decrypt the data twice, i.e., once for regular purposes and once for back up. In such cases, the maximum number equals 2.

Figure 6:
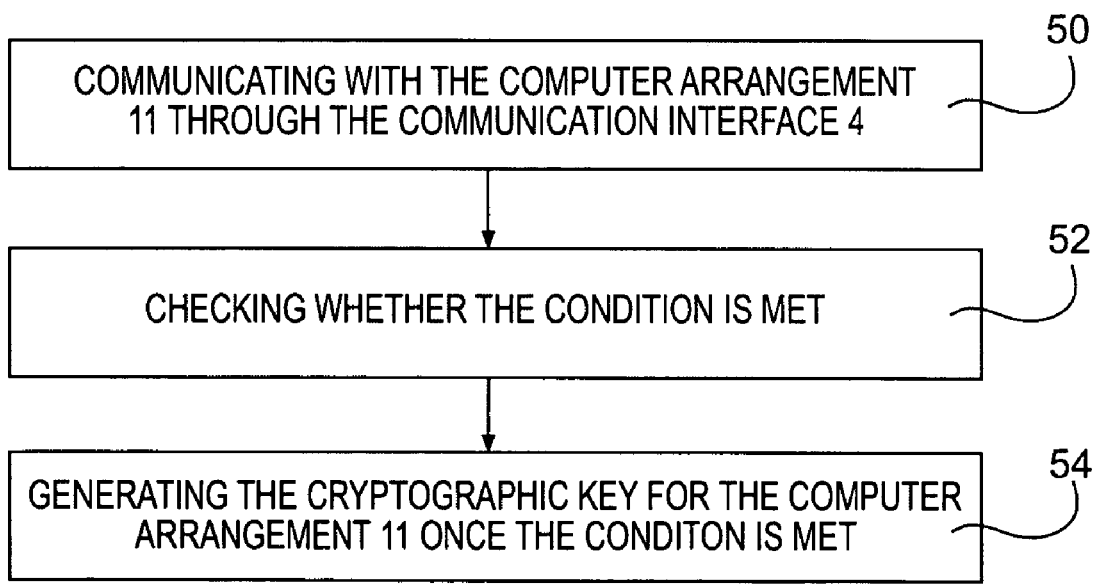

In general, as shown in FIG. 6, for checking the condition to be met the computer arrangement 11 and the data carrier 1 start communicating in step 50. In order to enhance security the condition is preferably checked by processor unit 5 of the data carrier 1, step 52. Only if the condition is met the processor unit 5 will generate the required key and send it to the processor 8 of the computer arrangement 11, step 54.

In order to be sure that both the key and the decryption algorithm are never entirely known to the computer arrangement protection and control over data use may be achieved by interaction between the processor unit 5 and the processor 8 such that the processor unit 5 performs additional computations necessary for the decryption algorithm. For effective operation with respect to speed of performance, such additional computations for decryption can be performed on a selected part of the data to be protected, e.g., every first 100 bytes of each retrieved 20 kbytes. To this end, FIG. 4 shows the situation that part of the encrypted data from the data carrier 1 is transferred to the processor unit 5 by computer arrangement 11.

Protection may further be enhanced by introducing an authentication mechanism of the user. Then, only when the user proves his/her authenticity to the processor unit 5 the latter will provide the correct key. To that end, passwords or user codes input by the user through one of the input means 20, 22 can effectively be used. Such a pass word or user code must then correspond to a password or user code stored in memory 7.

Alternatively, a password acceptance algorithm based on additional authentication data stored in the data carrier 1 may be used. Such authentication data may be read by processor 8 from the data carrier 1 and be transferred to the microprocessor 3 (see FIG. 4). A password input by a user may, e.g., be checked by the processor unit 5 as being valid upon checking whether or not it belongs to a dictionary of acceptable words stored as such authentication data in the data carrier 1 possibly complemented with rules for combining them, the rules being stored as an authentication key in memory 7.

User identification may also be carried out by using the smart card reader 13 and smart card 15 that belongs to a user who knows a password associated with the smart card 15.

As a further alternative, the smart card reader 13 may be arranged to read smart card 15 provided with an electronic purse facility and the processor unit 5 may be arranged to allow decryption of data from the data carrier 1 only when a predetermined amount of money has been paid through the electronic purse. A payment facility through the Internet is another option for paying in advance of any next decryption step.

The protection mechanism illustrated above may be expanded to providing different sets of keys for different sets of data on the data carrier.

The copy of the data to be protected and loaded in the computer memory 14 may be provided with a digital watermark calculated by the microprocessor 8 during the process of loading the data into the computer 11. The calculation algorithm used by the processor 8 to provide the watermark is derived from the data carrier 1. Alternatively, either a part of or the entire watermark is calculated by processor unit 5 and sent to the processor 8. The watermark may include the time of loading, user identity information or any other information to uniquely identify a stored copy of the loaded data. The watermark may use data elements of the data itself such that the data itself will at least be partly damaged if somebody tries to remove the watermark. The watermark serves as an identifier to locate the source of illegal copies of the data.

The processor 8 is shown to be one block. However, if preferred, the processor 8 may be implemented as several sub-processors communicating with one another each dedicated to perform a predetermined task. Preferably, the processor 8 is (or the sub-processors are) implemented as a computer with suitable software. However, if desired, it (or they) may be implemented as dedicated digital circuits.

The software running on the processor unit 5 of the data carrier 1 and on the processor 8 of the computer arrangement 11 may, prior to loading, be stored on a data carrier like a CDROM or may be distributed through a telecommunication connection (for instance entirely or partly wireless) like the Internet.

The invention claimed is:

1. A computer-readable medium provided with a memory area for storing data and a microprocessor comprising a communication interface for communication with an external device, a memory unit and a processor unit connected to both said communication interface and said memory unit, wherein the data comprises a first data portion which is arranged to be read by a computer arrangement and to be decrypted by the computer arrangement using at least one cryptographic key provided at least one condition is met, and said processor unit which is arranged to communicate with said computer arrangement through said communication interface in order to check whether said condition is met and to calculate said at least one cryptographic key for said computer arrangement once the condition is met, wherein the processor unit calculates the cryptographic key based on key related data and provided to the processor unit by the computer arrangement.

2. The computer-readable medium according to claim 1, wherein the key related data is necessary for the processor unit to calculate said at least one cryptographic key.

3. The computer-readable medium according to claim 2, wherein said at least one cryptographic key is calculated using one-time pad calculations.

4. The computer-readable medium according to claim 1, wherein said computer-readable medium has a circular shape with a center of rotation and said communication interface which is an antenna symmetrically shaped about said center of rotation.

5. The computer-readable medium according to claim 1, wherein one of said conditions to be met is user authentication and said processor unit is arranged to receive authentication information through said communication interface and to establish user authentication based on said received authentication information.

6. The computer-readable medium according to claim 5, wherein said authentication information comprises additional authentication data stored on said computer-readable medium, said memory unit storing an authentication key to validate said additional authentication data during said user authentication.

7. The computer-readable medium according to claim 1, wherein one of said conditions to be met is period of time said data may be read and decrypted by either said computer arrangement or another computer arrangement, said period of time being part of said data.

8. The computer-readable medium according to claim 1, wherein one of said conditions to be met is maximum number of times said data may be read and decrypted from said computer-readable medium, said maximum number of times being monitored by said processor unit.

9. The computer-readable medium according to claim 1, wherein said computer-readable medium is provided with a physical structure connected to said processor unit, said processor unit being arranged to check a physical integrity of said physical structure and stop operating as soon as said processor unit establishes that said physical integrity is violated.

10. A computer-readable medium provided with a memory area for storing data and a microprocessor comprising a communication interface for communication with an external device, a memory unit and a processor unit connected to both said communication interface and said memory unit, wherein the data comprises a first data portion which is arranged to be read by a computer arrangement and to be decrypted by the computer arrangement using at least one cryptographic key provided at least one condition is met, and said processor unit which is arranged to communicate with said computer arrangement through said communication interface in order to check whether said condition is met and to calculate said cryptographic key for said computer arrangement once the condition is met, wherein said first data portion comprises a plurality of further data portions, and said processor unit being arranged to calculate at least one further cryptographic key for said computer arrangement to decrypt each of said further data portions, said at least one further cryptographic key being calculated only when the processor unit has checked the validity of at least one further condition.

11. A computer-readable medium provided with a memory area for storing data and a microprocessor comprising a communication interface for communication with an external device, a memory unit and a processor unit connected to both said communication interface and said memory unit, wherein the data comprises a first data portion which is arranged to be read by a computer arrangement and to be decrypted by the computer arrangement using at least one cryptographic key provided at least one condition is met, and said processor unit which is arranged to communicate with said computer arrangement through said communication interface in order to check whether said condition is met and to calculate said cryptographic key for said computer arrangement once the condition is met, wherein the first data portion is arranged for transfer to said processor unit of said computer-readable medium and said processor unit is arranged to decrypt at least part of said first data portion using a decryption key stored in said memory unit to provide decrypted data for said computer arrangement, which further decryption key is not provided to said computer arrangement.

12. The computer-readable medium according to claim 11, wherein said processing unit provides said decrypted data with at least part of a digital watermark.

13. The computer-readable medium according to claim 11, wherein said processor unit is arranged for carrying out said decrypting based on executable codes received through said communication interface.

14. The computer-readable medium according to claim 13, wherein said executable code are part of said data.

15. A computer arrangement arranged to communicate with a computer-readable medium, said medium being provided with a memory area for storing data, the data including a first data portion and a second data portion, and a microprocessor comprising a communication interface, a memory unit and a processor unit connected to both said communication interface and said memory unit, said computer arrangement being provided with a processor, a first interface unit connected to said processor for communicating with said memory area of said computer-readable medium and a second interface unit connected to said processor for communicating with said processor unit through said communication interface, and wherein the computer arrangement is arranged to receive key related data included in the second data portion from the memory area of the computer-readable medium and to transmit the second data portion to the microprocessor to allow calculation of the at least one cryptographic key by the microprocessor when at least one condition is met.

16. The computer arrangement according to claim 15, arranged to carry out the following steps:
 (a) receiving at least one cryptographic key from said processor unit;
 (b) reading a first data portion from said memory area in said computer-readable medium; and
 (c) decrypting said first data portion using said at least one cryptographic key.

17. The computer arrangement according to claim 15, wherein one of said conditions to be met is user authentication and said computer arrangement is arranged to transmit authentication information to said processor unit through said communication interface to allow said processor unit to establish user authentication based on said information received.

18. The computer arrangement according to claim 15, wherein one of said conditions to be met is a period of time during which said data may be read and decrypted by said computer arrangement, data relating to said period of time being readable from said computer-readable medium by said computer arrangement and transferable to said processor unit.

19. The computer arrangement according to claim 15, wherein one of said conditions to be met is maximum number of times said data may be read from said computer-readable medium, said computer arrangement being arranged to retrieve additional data from said computer-readable medium to allow said processor unit to monitor said maximum number of times.

20. A method of reading and decrypting data from a computer-readable medium, said medium being provided with a memory area for storing data and a distinct microprocessor comprising a communication interface, a memory unit and a processor unit connected to both said communication interface and said memory unit, said method comprising the following steps:
 (a) receiving from an external computer system, key related data stored in the memory area,
 (b) calculating by the processor unit, at least one cryptographic key based on the key related data when at least one condition is met,
 (c) receiving the at least one cryptographic key from said processor unit,
 (d) reading a first data portion from said memory area in said computer-readable medium, and
 (e) decrypting said first data portion using said at least one cryptographic key.

21. A data carrier provided with a computer program for performing, when executed by a processor, a method of reading and decrypting data from a computer-readable medium, said medium being provided with a memory area for storing data and a distinct microprocessor comprising a communication interface, a memory unit and a
 processor unit connected to both said communication interface and said memory unit, said method comprising the following steps:
 (a) receiving from an external computer system, key related data stored in the memory area,
 (b) calculating by the processor unit, at least one cryptographic key based on the key related data when at least one condition is met,
 (c) receiving the at least one cryptographic key from said processor unit,
 (d) reading a first data portion from said memory area in said computer-readable medium, and
 (e) decrypting said first data portion using said at least one cryptographic key.

22. A computer program product for performing, when executed by a processor, a method of reading and decrypting a first data portion from a computer-readable medium, said medium being provided with a memory area for storing data and a microprocessor comprising a communication interface, a memory unit and a processor unit connected to both said communication interface and said memory unit, said memory area storing a second data portion including key related data, said method comprising the following steps:
 (a) reading, by a computer arrangement, said second data portion from said memory area,
 (b) sending, by the computer arrangement, said second data portion to said processor unit for calculating at least one cryptographic key when at least one condition is met,
 (c) receiving, by the computer arrangement, at least one cryptographic key from said processor unit,
 (d) reading, by the computer arrangement, a first data portion from said memory area in said computer-readable medium, and
 (e) decrypting by the computer arrangement, said first data portion using said at least one cryptographic key.

23. A method of providing access to data stored on a computer-readable medium, said medium being provided with a memory area storing said data and a microprocessor comprising a communication interface, a memory unit and a processor unit connected to both said communication interface and said memory unit, wherein said data comprises a first data portion which is arranged to be read by a computer arrangement and to be decrypted by said computer arrangement using at least one cryptographic key provided at least one condition is met, said method performed by the microprocessor including the steps of:
 (a) communicating with said computer arrangement through said communication interface,
 (b) checking whether said condition is met, and
 (c) calculating said at least one cryptographic key for said computer arrangement once the condition is met and based on key related data included in the data and provided to the processor unit by the computer arrangement.

24. A data carrier provided with a computer program for a method of providing access to data stored on a computer-readable medium, said medium being provided with a memory area storing said data and a distinct microprocessor comprising a communication interface, a memory unit and a processor unit connected to both said communication interface and said memory unit, wherein said data comprises a first data portion which is arranged to be read by a computer arrangement and to be decrypted by said computer arrangement using at least one cryptographic key provided at least one condition is met, said method performed by the microprocessor including the steps of:
 (a) communicating with said computer arrangement through said communication interface,
 (b) checking whether said condition is met, and
 (c) calculating said cryptographic key for said computer arrangement once the condition is met and based on a second data portion included in the data provided to the processor unit by the computer arrangement.

25. A computer program product for a method of providing access to data stored on a computer-readable medium, said medium being provided with a memory area storing said data and a microprocessor comprising a communication interface, a memory unit and a processor unit connected to both said communication interface and said memory unit, wherein said data comprises a first data portion which is arranged to be read by a computer arrangement and to be decrypted by said computer arrangement using at least one cryptographic key provided at least one condition is met, said method performed by the microprocessor including the steps of:
 (a) communicating with said computer arrangement through said communication interface,
 (b) checking whether said condition is met, and
 (c) calculating said cryptographic key for said computer arrangement once the condition is met and based on a second data portion included in the data provided to the processor unit by the computer arrangement.

26. A system for providing secure access to data, comprising:
a computer-readable medium including a data portion storing at least one set of data and a first processing system embedded on the computer-readable medium, the first processing system including:
an interface unit,
a memory unit, and
a processor unit configured to calculate a cryptographic key based on key related data stored on the computer-readable medium when at least one condition is met; and a second processing system configured to request access to the data portion, wherein the second processing system retrieves the key related data from the computer-readable medium and provides the key related data to the first processing system through the interface unit, and wherein the second processing system receives the cryptographic key from the first processing system and decrypts the data portion using the cryptographic key.

* * * * *